(12) United States Patent
Vayanos et al.

(10) Patent No.: US 6,747,958 B2
(45) Date of Patent: Jun. 8, 2004

(54) TRANSPORT FORMAT COMBINATION SELECTION FOR COMPRESSED MODE IN A W-CDMA SYSTEM

(75) Inventors: Alkinoos Hector Vayanos, San Diego, CA (US); Serge Willenegger, San Diego, CA (US); Josef Blanz, Munich (DE)

(73) Assignee: Qualcomm, Incorporated, San Diego, CA (US)

( * ) Notice: Subject to any disclaimer, the term of this patent is extended or adjusted under 35 U.S.C. 154(b) by 251 days.

(21) Appl. No.: 09/993,381

(22) Filed: Nov. 13, 2001

(65) Prior Publication Data

US 2003/0092382 A1 May 15, 2003

(51) Int. Cl.[7] ................................................ H04J 13/00
(52) U.S. Cl. ........................ 370/252; 370/335; 370/342
(58) Field of Search ................................ 370/252, 335, 370/342

(56) References Cited

U.S. PATENT DOCUMENTS

| | | | |
|---|---|---|---|
| 2002/0097695 A1 * | 7/2002 | Herrmann | 370/329 |
| 2003/0112786 A1 * | 6/2003 | Terry et al. | 370/342 |
| 2003/0148781 A1 * | 8/2003 | Sommer | 455/522 |

FOREIGN PATENT DOCUMENTS

| | | |
|---|---|---|
| EP | 1089458 A2 | 4/2001 |
| WO | 0141332 | 6/2001 |

* cited by examiner

Primary Examiner—Melvin Marcelo
(74) Attorney, Agent, or Firm—Philip R. Wadsworth; Thien T. Nguyen; S. Hossain Beladi

(57) ABSTRACT

Techniques for determining valid (i.e., supported) TFCs from among all configured TFCs for normal and compressed modes. These techniques maintain sufficient historical information such that "TFC qualification" may be accurately performed. In a first scheme, Tx_power_requirement states are maintained for different combinations of each TFC. One combination is applicable for each TFC at each TFC interval, and valid TFCs are determined from applicable combinations in the proper state(s). In a second scheme, two Tx_power_requirement states are maintained for each TFC for the normal and compressed modes. In a third scheme, a single Tx_power_requirement state is maintained for each TFC for both modes based on a particular relative power requirement. In a fourth scheme, Tx_power_requirement states are maintained for a set of relative "bins" that cover the total range of required transmit power for all TFCs. And in a fifth scheme, a set of relative power requirement thresholds are maintained.

41 Claims, 9 Drawing Sheets

TRANSPORT FORMAT COMBINATION SELECTION FOR COMPRESSED MODE IN A W-CDMA SYSTEM

BACKGROUND

1. Field

The present invention relates generally to data communication, and more specifically to techniques for determining transport format combinations (TFCs) supported for use in normal and compressed modes in a wireless (e.g., W-CDMA) communication system.

2. Background

Wireless communication systems are widely deployed to provide various types of communication including voice and packet data services. These systems may be based on code division multiple access (CDMA), time division multiple access (TDMA), frequency division multiple access (FDMA), or some other multiple access technique. CDMA systems may provide certain advantages over other types of system, including increased system capacity. A CDMA system is typically designed to conform to one or more standards, such as IS-95, cdma2000, and W-CDMA standards, all of which are known in the art and incorporated herein by reference.

The W-CDMA standard supports data transmission on one or more transport channels, and each transport channel may be associated with one or more transport formats (TFs) that may be used for the data transmission. Each transport format defines various processing parameters such as the transmission time interval (TTI) over which the transport format applies, the size of each transport block of data, the number of transport blocks within each TTI, the coding scheme to be used for the transport blocks in a given TTI, and so on. The use of multiple transport formats for a given transport channel allows different types or rates of data to be transmitted over the same transport channel. At any given moment, a specific transport format combination (TFC), which comprises one transport format for each transport channel, is selected from among a number of possible transport format combinations and used for all transport channels.

The W-CDMA standard also supports a "compressed mode" of operation on the uplink whereby data is transmitted from a terminal to a base station within a shortened time duration (i.e., compressed in time). The compressed mode is used in W-CDMA to allow a terminal in active communication with the system (i.e., on a traffic channel) to temporarily leave the system in order to perform measurements on a different frequency and/or a different Radio Access Technology (RAT) without losing data from the system. In the compressed mode for the uplink, data is transmitted by the terminal during only a portion of a (10 msec) frame so that the remaining portion of the frame (referred to as a transmission gap) may be used by the terminal to perform the measurements.

In accordance with the W-CDMA standard, the reduction in the transmission time for a compressed frame may be achieved by (1) reducing the amount of data to transmit in the frame, (2) increasing the coding rate, or (3) increasing the data rate. Reducing the amount of data to transmit in the compressed frame may be impractical for some applications, such as voice, since the data reduction may result in significantly reduced quality of service. Increasing the coding rate or data rate may be possible if the transmit power for the compressed frame is increased such that the energy-per-bit-to-total-noise-plus-interference ratio ($E_b/N_t$) for the compressed frame is similar to that for a non-compressed frame.

As noted above, a number of transport channels may be concurrently supported and a set of transport formats may be defined for each transport channel. A set of "configured" transport format combinations may be defined for the transport channels, with each such transport format combination being associated with a particular relative transmit power level needed to achieve a target block error rate (BLER). The required transmit power for each transport format combination is dependent on (1) whether or not the terminal is in the compressed mode and (2) the parameter values defining the compressed transmissions in the compressed mode. To achieve high system performance, only the configured transport format combinations supported by the terminal's maximum transmit power at the current channel conditions (i.e., those that can be transmitted with the required power for achieving the target block error rate) should be identified as those that may be selected for use. And only one specific transport format combination would then be selected from this set of supported transport format combinations for actual use at the next frame (shortest TTI) boundary.

There is therefore a need in the art for techniques for determining transport format combinations supported for use in normal and compressed modes in a W-CDMA system.

SUMMARY

Aspects of the invention provide various techniques for determining valid (i.e., supported) TFCs from among all configured TFCs for normal and compressed modes. These techniques maintain sufficient historical information (in various forms) such that "TFC qualification" may be accurately performed regardless of whether or not a TTI includes a compressed transmission. A number of TFC qualification schemes are provided herein. These schemes may be used in conjunction with an algorithm defined in W-CDMA whereby the determination of whether or not a TFC may be transmitted reliably is dependent on the TFC's required transmit power for Y previous measurement periods and the maximum available transmit power at the terminal (described below). The information needed to determine whether or not a given TFC may be transmitted reliably comprises a Tx_power_requirement state for that TFC.

In a first scheme, a Tx_power_requirement state is maintained for each combination of compressed and non-compressed frames for each TFC. As used herein, "combination" refers to a specific combination of compressed and/or non-compressed frames for a given TFC and for a given TFC interval. The TFC interval is the longest TTI of any of the transport channels on which data is transmitted with this TFC. As used herein, "transport format combination" or "TFC" refers to a specific combination of transport formats that may be used for transmitting data on the configured transport channels. For each TFC selection interval, the specific combination applicable for the upcoming interval for each TFC is identified. The appropriate TFC state is then identified for each TFC based on this combination. (There is only one applicable combination for each TFC interval, and the states for all TFCs corresponding to this combination are determined.) The set of valid TFCs is finally determined based on whether they are in the proper state(s) (e.g., those in the Supported state and possibly the Excess-Power state defined in W-CDMA).

In a second scheme, two Tx_power_requirement states are maintained for each TFC for the normal and compressed modes, i.e., one state for the normal mode (which has no transmission gaps) and the other state for the combination requiring the most transmit power (e.g., the worst possible case, or worst case based on the configured transmission gap pattern sequences). For each TFC selection interval, the applicable combination is identified for each TFC, and the valid TFCs are then determined based on whether or not they are in the proper state(s).

In a third TFC qualification scheme, a single Tx_power_requirement state is maintained for each TFC for both normal and compressed modes. This single Tx_power_requirement state may be maintained for each TFC for a compressed mode relative power requirement, $\alpha_{cm,i}$, which may be defined as the relative power requirement for the normal mode, $\alpha_{ref,i}$, times an offset $\alpha_{offset,i}$ (i.e., $\alpha_{cm,i} = \alpha_{ref,i} \cdot \alpha_{offset,i}$).

In a fourth scheme, a number of Tx_power_requirement states is maintained for a set of "bins" that cover the total range of relative required transmit powers for all TFCs for the normal and compressed modes. Each combination for each TFC is associated with a particular relative required transmit power, and may therefore be associated with a specific bin and further utilize the Tx_power_requirement state maintained for that bin.

In a fifth scheme, a set of relative power requirement "thresholds" are determined and maintained for Y measurement periods. The relative power requirement threshold, $\alpha_{th}(k)$, for each measurement period may be defined as the ratio of the maximum available transmit power, $P_{max}$, over the required transmit power for a reference transmission, $P_{ref}(k)$ (i.e., $\alpha_{th}(k) = P_{max}/P_{ref}(k)$). The state of each TFC may then be determined based on the TFC's relative required transmit power for the upcoming interval, the set of relative power requirement thresholds, and a (e.g., 2-bit) state and a timer maintained for each combination for each TFC.

These various schemes and their variants and various other aspects and embodiments of the invention are described in further detail below. The invention further provides methods, program codes, digital signal processors, receiver units, terminals, base stations, systems, and other apparatuses and elements that implement various aspects, embodiments, and features of the invention, as described in further detail below.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein.

DETAILED DESCRIPTION

The techniques for determining supported transport format combinations (TFCs) described herein may be used in various CDMA systems. These techniques may also be applied to the downlink, the uplink, or both. For clarity, various aspects and embodiments of the invention are specifically described for the uplink in a W-CDMA system.

Figure 1:
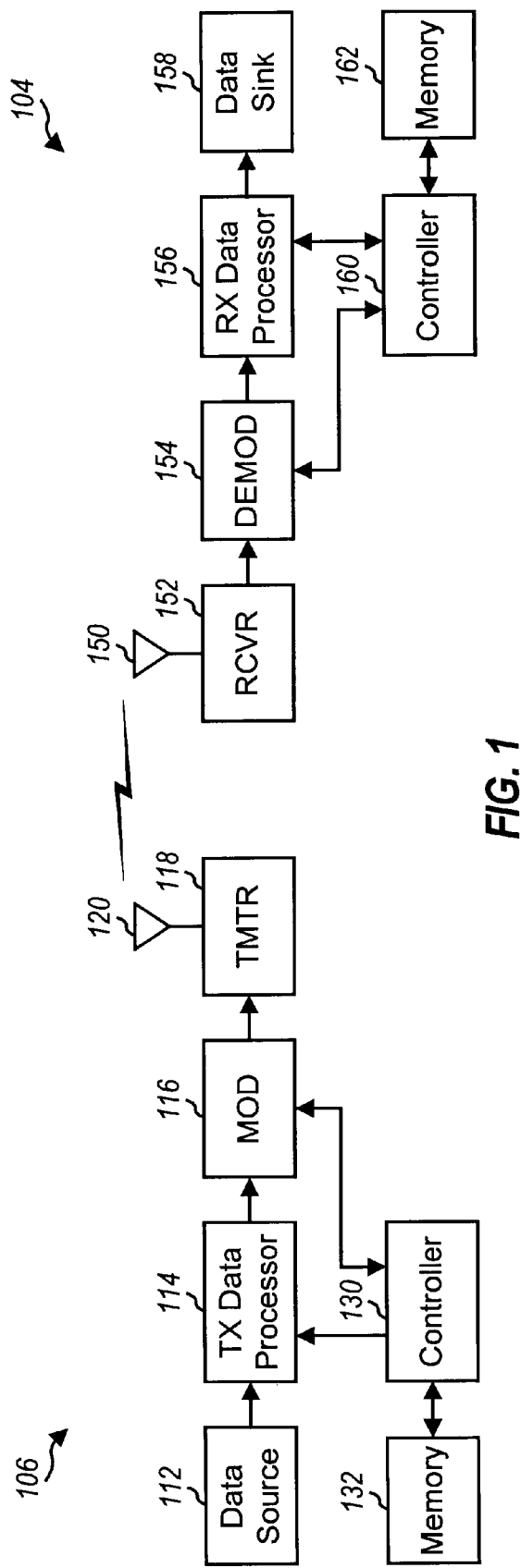
FIG. 1 is a simplified block diagram of an embodiment of a base station and a terminal.

FIG. 1 is a simplified block diagram of an embodiment of a base station 104 and a terminal 106, which are capable of implementing various aspects and embodiments of the invention. The base station is part of the UMTS Radio Access Network (UTRAN) and the terminal is also referred to as user equipment (UE) in W-CDMA. Other terminology may also be used for the base station and terminal in other standards and systems.

On the uplink, at terminal 106, a transmit (TX) data processor 114 receives different types of traffic such as user-specific data from a data source 112, messages from a controller 130, and so on. TX data processor 114 then formats and codes the data and messages based on one or more coding schemes to provide coded data. Each coding scheme may include any combination of cyclic redundancy check (CRC) coding, convolutional coding, Turbo coding, block coding, and other coding, or no coding at all. Typically, different types of traffic are coded using different coding schemes.

The coded data is then provided to a modulator (MOD) 116 and further processed to generate modulated data. For W-CDMA, the processing by modulator 116 includes (1) "spreading" the coded data with orthogonal variable spreading factor (OVSF) codes to channelize the user-specific data and messages onto one or more physical channels and (2) "scrambling" the channelized data with scrambling codes. The spreading with OVSF codes is equivalent to covering with Walsh codes in IS-95 and cdma2000, and the scrambling with scrambling codes is equivalent to spreading with short pseudo-random noise (PN) sequences in IS-95 and cdma2000. The modulated data is then provided to a transmitter (TMTR) 118 and conditioned (e.g., converted to one or more analog signals, amplified, filtered, and quadrature modulated) to generate an uplink modulated signal suitable for transmission via an antenna 120 over a wireless communication channel to one or more base stations.

At base station 104, the uplink modulated signal is received by an antenna 150 and provided to a receiver (RCVR) 152. Receiver 152 conditions (e.g., filters, amplifies, and downconverts) the received signal and digitizes the conditioned signal to provide data samples. A demodulator (DEMOD) 154 then receives and processes the data samples to provide recovered symbols. For W-CDMA, the processing by demodulator 154 includes (1) descrambling the data samples with the same scrambling code used by the terminal, (2) despreading the descrambled samples to channelize the received data and messages onto the proper physical channels, and (3) (possibly) coherently demodulating the channelized data with a pilot recovered from the received signal. A receive (RX) data processor 156 then receives and decodes the symbols to recover the user-specific data and messages transmitted by the terminal on the uplink.

Controllers 130 and 160 control the processing at the terminal and the base station, respectively. Each controller may also be designed to implement all or a portion of the process to select transport format combinations for use described herein. Program codes and data required by controllers 130 and 160 may be stored in memories 132 and 162, respectively.

Figure 2:
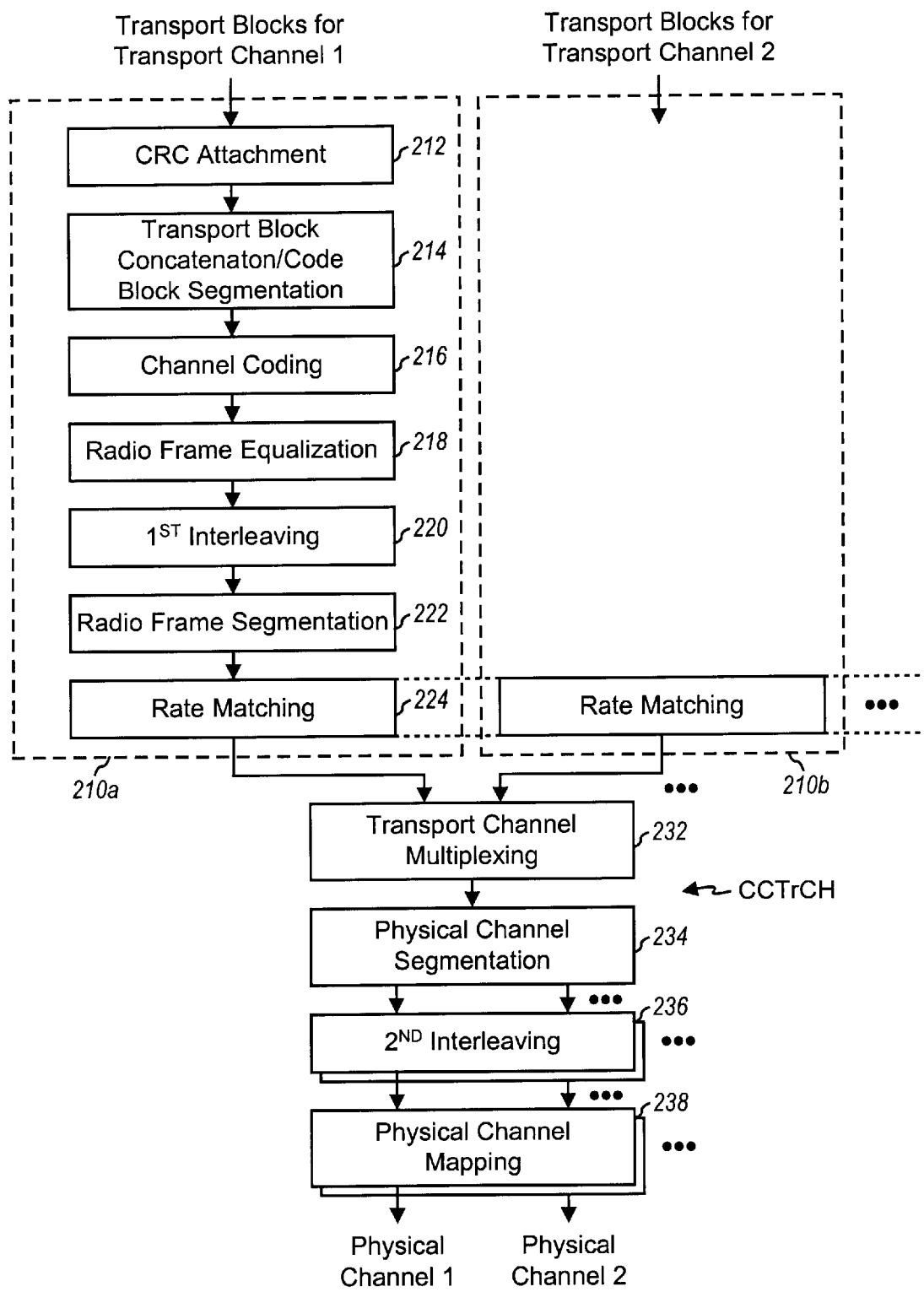
FIG. 2 is a diagram of the signal processing at the terminal for an uplink data transmission in accordance with the W-CDMA standard.

FIG. 2 is a diagram of the signal processing at the terminal for an uplink data transmission, in accordance with the W-CDMA standard. A W-CDMA system supports data transmission on one or more transport channels, with each transport channel being capable of carrying data for one or more services. These services may include voice, video, packet data, and so on. The data to be transmitted is initially processed as one or more transport channels at a higher signaling layer. The transport channels are then mapped to one or more physical channels assigned to the terminal. In W-CDMA, an uplink dedicated physical channel (uplink DPCH) is typically assigned to the terminal for the duration of the communication. The uplink DPCH comprises an uplink dedicated physical data channel (DPDCH) used to carry the transport channel data and an uplink dedicated physical control channel (DPCCH) used to carry control data (e.g., pilot, power control information, and so on).

The data for each transport channel is processed based on the transport format (TF) selected for that transport channel (a single TF is selected at any given time). Each transport format defines various processing parameters such as the transmission time interval (TTI) over which the transport format applies, the size of each transport block of data, the number of transport blocks within each TTI, the coding scheme to be used for the TTI, and so on. The TTI may be specified as 10 msec, 20 msec, 40 msec, or 80 msec. Each TTI may be used to transmit a transport block set having $N_B$ equal-sized transport blocks, as specified by the transport format for the TTI. For each transport channel, the transport format can dynamically change from TTI to TTI, and the set of transport formats that may be used for the transport channel is referred to as the transport format set (TFS).

As shown in FIG. 2, the data for each transport channel is provided, in one or more transport blocks for each TTI, to a respective transport channel processing section 210. Within each processing section 210, the data in each transport block is used to derive a set of CRC bits, in block 212. The CRC bits are attached to the transport block and may be used later by the base station for block error detection. The one or more CRC-coded blocks for each TTI are then serially concatenated together, in block 214. If the total number of bits after concatenation is greater than the maximum size of a code block, then the bits are segmented into a number of (equal-sized) code blocks. The maximum code block size is determined by the particular coding scheme (e.g., convolutional, Turbo, or no coding) selected for use for the current TTI, which is specified in the transport channel's transport format for the TTI. Each code block is then coded with the selected coding scheme or not coded at all, in block 216, to generate coded bits.

Radio frame equalization is then performed by padding the coded bit in order to ensure that the coded and padded bits can be segmented into an integer number of data segments of the same size, in block 218. The bits for each TTI are then interleaved in accordance with a particular interleaving scheme to provide time diversity, in block 220. In accordance with the W-CDMA standard, the interleaving is performed over the TTI specified by the transport format, which can be 10 msec, 20 msec, 40 msec, or 80 msec. If the selected TTI is longer than 10 msec, then the interleaved bits within the TTI are segmented and mapped onto consecutive transport channel frames, in block 222. Each transport channel frame corresponds to a portion of the TTI that is to be transmitted over a (10 msec) physical channel radio frame period (or simply, a "frame").

Rate matching is then performed for the transport channel frames for all transport channels for each frame, in block 224. Rate matching is performed in accordance with a rate-matching attribute assigned by higher signaling layers and specified in the transport format. On the uplink, bits are repeated or punctured (i.e., deleted) such that the number of bits to be transmitted matches the number of available bit positions.

The rate-matched transport channel frames from all active transport channel processing sections 210 are then serially multiplexed into a coded composite transport channel (CCTrCH), in block 232. If more than one physical channel is used, then the bits are segmented among the physical channels, in block 234. The bits in each frame for each physical channel are then further interleaved to provide additional time diversity, at block 236. The interleaved bits are then mapped to the assigned physical channels, at block 238. The signal processing shown in FIG. 2 may be performed by TX data processor 114 in FIG. 1.

Figure 3:
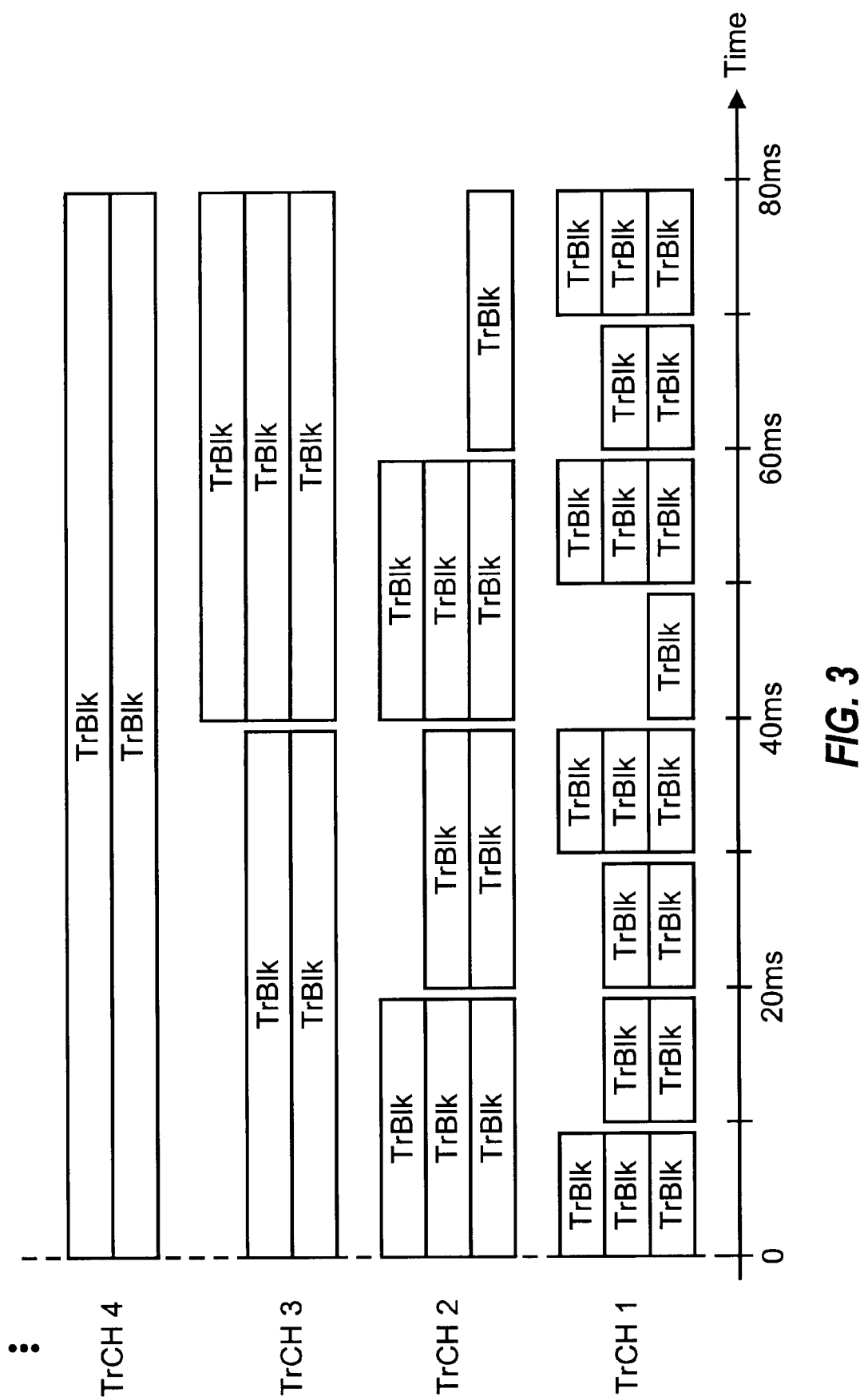
FIG. 3 illustrates a number of different transport formats that may be used for different transport channels.

FIG. 3 illustrates a number of different transport formats that may be used for different transport channels. As noted above, a number of transport channels may be concurrently supported, as described in the 3GPP Document No. 25.306-320 (Section 5.1), which is available from 3GPP organization and incorporated herein by reference. Each transport channel may be associated with a respective transport format set that includes one or more transport formats available for use for the transport channel. The transport format set for each transport channel is configured through higher layer signaling. The transport format for W-CDMA is defined in 3GPP Document No. 25.302-390 (Section 7), which is incorporated herein by reference.

In the example shown in FIG. 3, transport channels 1 through 4 are associated with TTIs of 10, 20, 40, and 80 msec, respectively. For each TTI of each transport channel, a particular number of transport blocks may be transmitted and each block includes a particular number of bits, as defined by the transport channel's transport format for the TTI. The transport format may change from TTI to TTI for each transport channel, and the specific transport format used for each TTI is selected from a set of transport formats associated with the transport channel.

As also shown in FIG. 3, a particular transport format combination (TFC) is applicable for each TFC selection interval, which corresponds to the shortest TTI of all the active transport channels (e.g., which is 10 msec for the example shown in FIG. 3). Each TFC is a specific combination of one particular transport format for each of the active transport channels. The TFC can vary from interval to interval, and the specific TFC to be used for each interval is selected from among a set of "configured" TFCs. This transport format combination set thus comprises all possible TFCs that may be selected for use for the active transport channels.

For each TFC selection interval, a specific TFC is selected for use from among the set of configured TFCs. The TFC selection is performed in a two-part process. In the first part, which is referred to herein as TFC qualification or TFC elimination, the terminal determines which ones of the configured TFCs may be transmitted reliably given the terminal's maximum available transmit power, $P_{max}$, which may be either the terminal's maximum transmit power or the maximum allowed transmit power imposed on the terminal by the system. These TFCs are referred to as "valid" or "supported" TFCs. In the second part, one of the valid TFCs is selected for actual use based on a set of criteria. Each of these two parts is described in further detail below.

Figure 4:
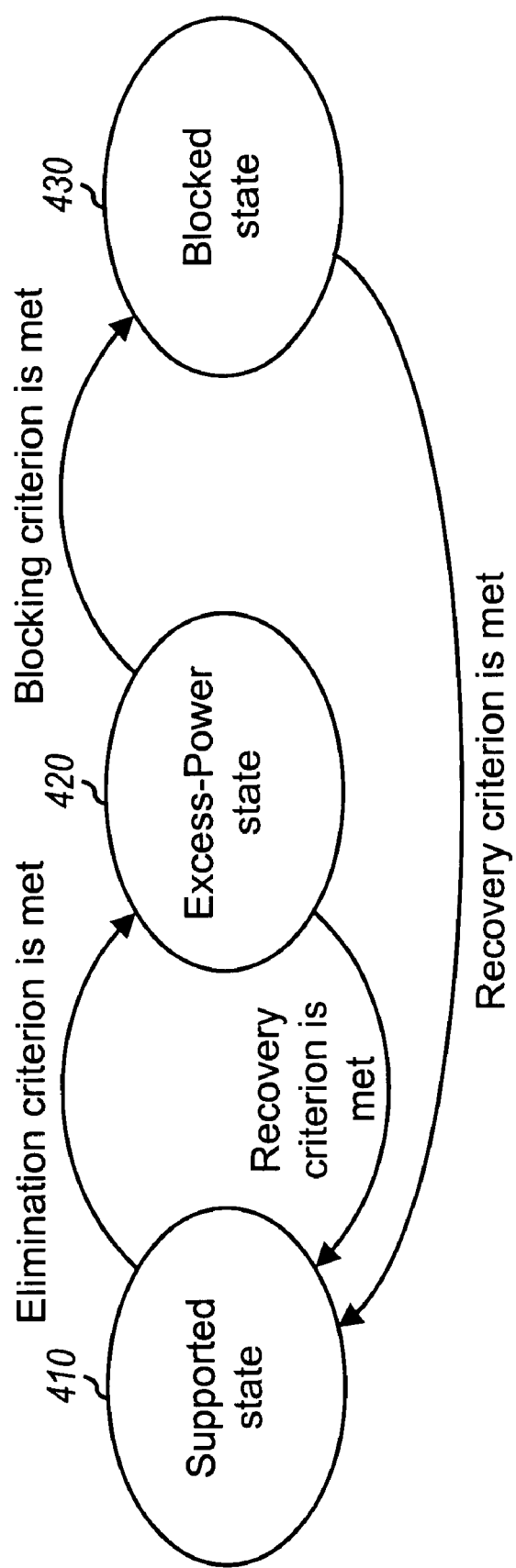
FIG. 4 is a state diagram of the possible states for each configured TFC, as defined by W-CDMA.

FIG. 4 is a state diagram of the possible states for each configured TFC, as defined by W-CDMA. The state diagram includes three states—a Supported state 410, an Excess-Power state 420, and a Blocked state 430. Each TFC may be in any one of these three states depending on whether or not certain criteria are met.

To achieve a particular level of performance, the transmit power for a data transmission from the terminal is controlled by a power control mechanism such that the received signal quality at the base station is maintained at a particular target energy-per-bit-to-noise-plus-interference ratio ($E_b/N_t$). This target $E_b/N_t$ (which is also referred to as the setpoint) is typically adjusted to achieve the desired level of performance, which may be quantified by a particular (e.g., 1%) block error rate (BLER) or frame error rate (FER). Because the total number of transmitted data bits is typically different from TFC to TFC, different amounts of transmit power are typically required for different TFCs to achieve the setpoint.

Each TFC requires a particular amount of power in order to be transmitted reliably (i.e., to achieve the setpoint). The required transmit power for each TFC may be normalized relative to the transmit power, $P_{ref}$, required to transmit reliably a reference transmission, which may be the transmission on the DPCCH or a transmission for a reference TFC. The power level, $P_{ref}$, is continuously adjusted by the power control mechanism to achieve the desired level of performance (e.g., 1% BLER). Each TFC may then be associated with a respective relative power requirement, $\alpha_i$, that is indicative of the transmit power required for the TFC. In an embodiment, the relative power requirement, $\alpha_i$, is defined as the ratio of the TFC's required transmit power over the transmit power for the reference transmission. In this case, a given TFC may be transmitted reliably if the following condition is satisfied:

$$\alpha_i \cdot P_{ref} \leq P_{max}, \qquad \text{Eq(1)}$$

where $\alpha_i \cdot P_{ref}$ represents the required transmit power for the i-th TFC. The relative power requirement, $\alpha_i$, for each TFC may be determined based on the bit rate for the TFC and the bit rate for the reference transmission, as described in 3GPP Document No. 25.214-360 (Section 5.1.2.5.3), which is incorporated herein by reference.

In accordance with the W-CDMA standard, a TFC transitions from Supported state 410 to Excess-Power state 420 upon fulfilling an Elimination criterion, which occurs if $\alpha_i \cdot P_{ref} > P_{max}$ for more than X out of the last Y measurement periods, where X and Y and the measurement period may be defined by the W-CDMA standard. The TFC then transitions from Excess-Power state 420 to Blocked state 430 upon fulfilling a Blocking criterion, which occurs if the TFC has been in the Excess-Power state for longer than a particular time period, $T_{block}$, which is defined by the W-CDMA standard. The TFC transitions from the Excess-Power state or the Blocked state back to the Supported state upon fulfilling a Recovery criterion, which occurs if $\alpha_i \cdot P_{ref} \leq P_{max}$ for the last Y measurement periods. The state diagram and the criteria for transitioning between the states are described respectively in 3GPP Documents No. 25.321-390 (Section 11.4) and No. 25.133-370 (Section 6.4), which are incorporated herein by reference.

The state diagram shown in FIG. 4 is maintained for each configured TFC. For each TFC selection interval, all TFCs in the Supported state are identified as valid TFCs, and all TFCs in the Blocked state are eliminated from use for an upcoming interval. Depending on the particular implementation, the TFCs in the Excess-Power state may be either identified as valid TFCs or eliminated. It can also be noted that the TFCs are only blocked at the boundary of the longest TTI of the active transport channels, and the set of valid TFCs determined based on power constraints does not change in the middle of the longest TTI.

In one implementation for performing TFC qualification, a set of bits is maintained for each TFC, and each bit stores an indicator that indicates whether or not $\alpha_i \cdot P_{ref} > P_{max}$ for the TFC for a respective one of the last Y measurement periods. For each measurement period, equation (1) is evaluated for each TFC and a new indicator is determined based on the outcome of the evaluation and stored in one of the bits maintained for the TFC. The Elimination, Blocking, and Recovery criteria are then evaluated for each TFC based on the Y indicators determined for the last Y measurement periods, and the TFC's state is then updated accordingly. The TFC's current state and the set of Y indicators for the TFC are collectively referred to as a TFC Tx_power_requirement state. For this implementation, $N_T$ sets of Y+2 bits (Y bits for the indicators and 2 bits for the TFC state) would be sufficient to maintain the states of $N_T$ different TFCs. Some additional bits may also be provided for each Tx_power_requirement state to maintain the timer in the Excess-Power state. For example, four additional bits would be sufficient if $T_{block}$ is in the order of 120 msec.

The outcome for each of the three criteria is the same for a given relative power requirement, $\alpha_i$, independent of what transport formats are included in the TFC. The number of configured TFCs may be large (e.g., a TFC set may be defined to include as many as 1024 TFCs). However, the number of unique relative power requirements (after quantization) may be significantly less than the number of configured TFCs. In this case, $N_A$ sets of Y indicators and $N_A$ 2-bit states may be maintained for $N_A$ unique relative power requirements, as described below, instead of maintaining $N_T$ sets of Y indicators and $N_T$ 2-bit states for $N_T$ different TFCs. Each TFC may then be associated with a particular relative power requirement, $\alpha_i$. For each TFC selection interval, all configured TFCs associated with relative power requirements that are in the Supported state (and possibly the Excess-Power state) may then be identified as valid TFCs.

As noted above, the W-CDMA standard supports a compressed mode on the uplink whereby user-specific data is transmitted by the terminal within a shortened period of time. As part of a scheme to more efficiently distribute system resources, the system can command the terminal to monitor base stations on other frequencies and/or other radio access technologies (RATs) that can be supported by the terminal. To allow the terminal to perform the required measurements as necessary based on the terminal's capabilities, the system can command the terminal to operate in the compressed mode.

Figure 5:
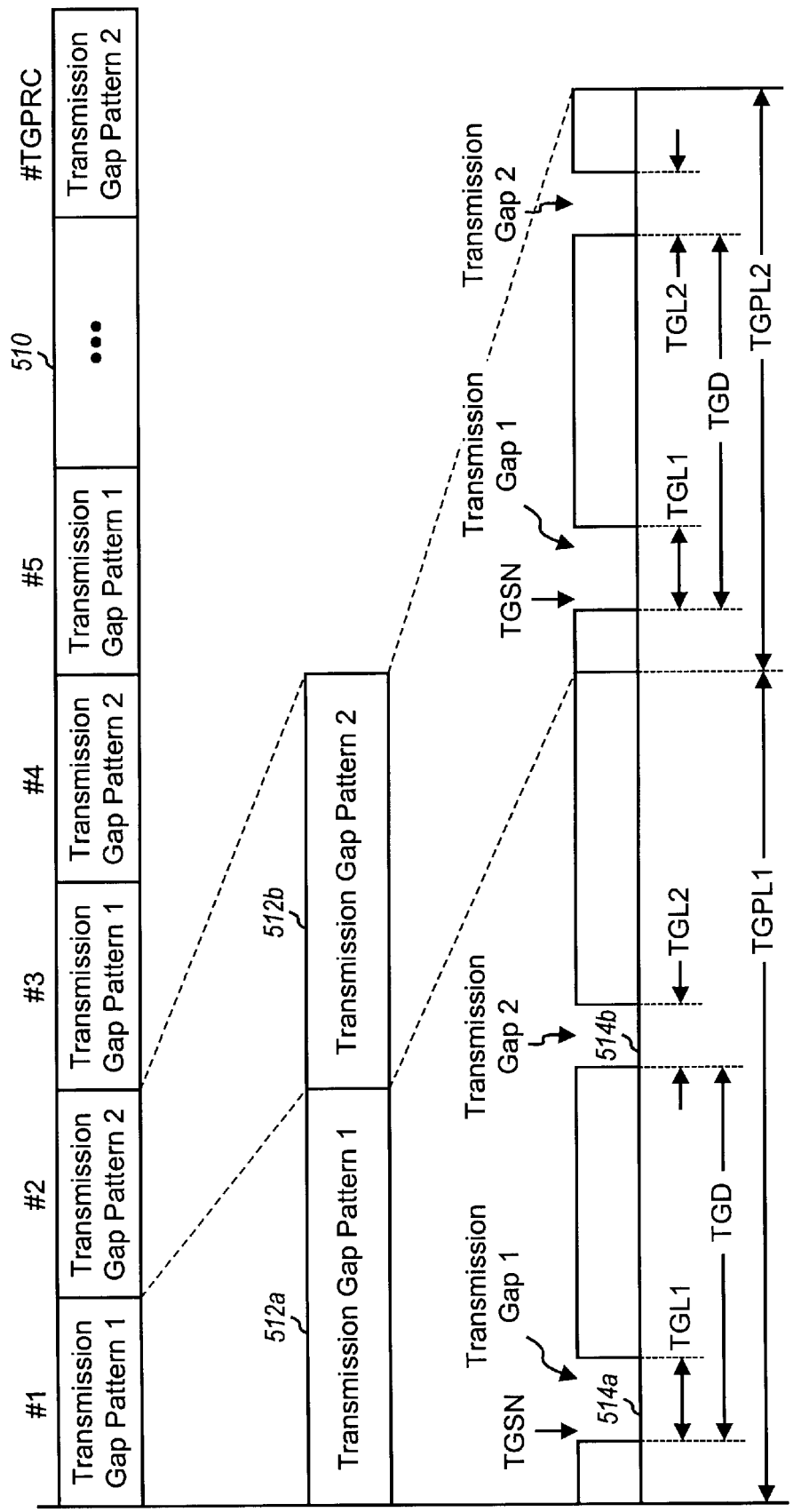
FIG. 5 is a diagram illustrating a compressed mode transmission in accordance with the W-CDMA standard.

FIG. 5 is a diagram illustrating a compressed mode transmission in accordance with the W-CDMA standard. In the compressed mode, user-specific data from the terminal is transmitted in accordance with a transmission gap pattern sequence 510, which is made up of alternating transmission gap patterns 1 and 2, respectively 512a and 512b. Each transmission gap pattern 512 comprises a series of one or more compressed frames followed by zero or more non-compressed frames. Each compressed frame includes one or more compressed transmissions and all or a portion of a transmission gap. Each transmission gap may reside completely within a single (10 msec) frame or may span two frames. The data for each compressed frame is transmitted in the compressed transmission(s), and the data for each non-compressed frame is transmitted over the entire frame. Each frame is further divided into 15 equal slots numbered from 0 through 14, with each slot having a duration of 0.667 msec.

A compressed frame series for each transmission gap pattern includes compressed data transmission interrupted by one or two transmission gaps 514. The parameters for transmission gap pattern sequence 510 are as follows:

TGSN (transmission gap starting slot number)—the slot number of the first transmission gap slot within the first radio frame of the transmission gap pattern (slot 1 to 14).

TGL1 (transmission gap length 1)—the duration of the first transmission gap within the transmission gap pattern (1 to 14 slots). The slots for the transmission gap must be distributed over two frames if TGL1>8 since at most 7 transmission gap slots can be included in a single frame.

TGL2 (transmission gap length 2)—the duration of the second transmission gap within the transmission gap pattern (1 to 14 slots). The same restriction as for TGL1 applies.

TGD (transmission gap distance)—the duration between the starting slots of two consecutive transmission gaps within a transmission gap pattern (15 to 269 slots, or 1 to almost 18 frames).

TGPL1 (transmission gap pattern length 1)—the duration of transmission gap pattern 1 (1 to 144 frames).

TGPL2 (transmission gap pattern length 2)—the duration of transmission gap pattern 2 (1 to 144 frames).

The compressed mode is further described in Documents Nos. 3GPP TS 25.212-370 (Section 4.4), 25.213-360 (Sections 5.2.1 and 5.2.2), and 25.215-380 (Section 6.1), which are all incorporated herein by reference.

Figure 6:
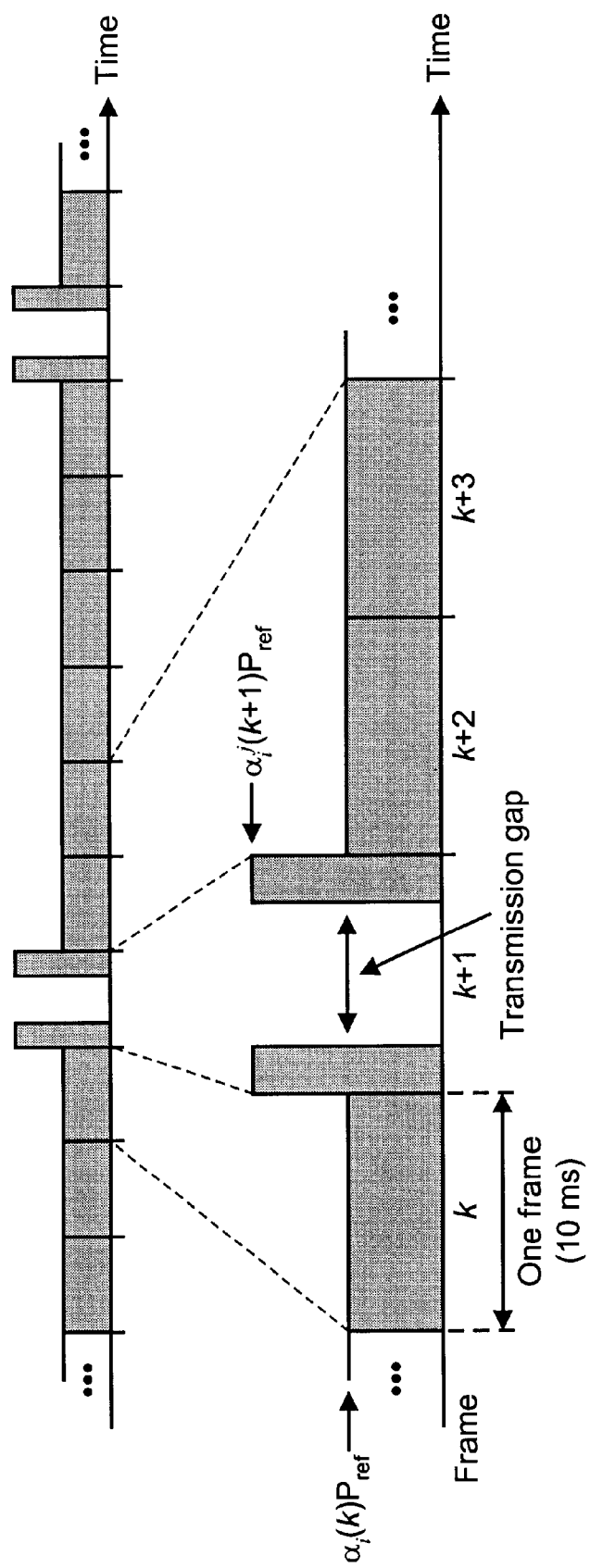
FIG. 6 is a diagram illustrating a data transmission in the compressed mode.

FIG. 6 is a diagram illustrating a data transmission in the compressed mode supported by W-CDMA standard. In the example shown in FIG. 6, non-compressed frames k, k+2, and k+3 are transmitted at a particular transmit power, $\alpha_i \cdot P_{ref}$, required for the TFC(s) selected for use for those non-compressed frames. The data for compressed frame k+1 is transmitted within a shortened time period because of the transmission gap. To achieve the required $E_b/N_t$ for the compressed frame, the transmit power for compressed frame k+1 is increased by an amount related to the increase in the data rate for the compressed transmission.

The compressed mode has a direct impact on the TFC selection process since the presence of a transmission gap affects the amount of power required to transmit a given TFC reliably. If a TTI includes a compressed frame, the relative power requirement, $\alpha_i$, for each configured TFC increases by some particular amount depending on the particulars of the transmission gap(s) included in that TTI. Thus, if the Y indicators are derived for non-compressed frames for Y previous measurement periods, then these indicators would not be valid for the compressed frame.

In the compressed mode, a number of "combinations" of compressed and/or non-compressed frames may thus be possible for each TFC. Each such combination corresponds to a specific combination of compressed and/or non-compressed frames to be transmitted on one or more active transport channels for the TFC for a given TFC interval. The TFC interval is the longest TTI of any of the transport channels on which data is transmitted with this TFC. Each combination is further associated with a particular relative required transmit power level. Two combinations are considered different for a given TFC if they are associated with different relative transmit power requirements. This will typically be the case if for any of the TTI lengths of one of the transport channels on which data is transmitted with the TFC, the sums of transmission gaps over this TTI is different for the two "combinations".

The specific number of possible combinations for each TFC is dependent on various factors such as (1) the number of transmission gap patterns to be used for the active transport channels, (2) the TTIs of the transport channels, (3) the transmission gap length, (4) the distance between the transmission gaps of each pattern, and (5) the periodicity of the different patterns (i.e., the "slide" of each pattern relative to the other patterns).

As an example, consider a specific compressed mode case with the following parameters:

three active compressed mode patterns for the physical channels, which impact the transport channels;

an average longest TTI length across all configured TFCs of 40 msec;

a single transmission gap length for each pattern (i.e., same length for transmission gaps 1 and 2);

different transmission gap lengths for different patterns (i.e., different lengths for transmission gap 1 for different patterns); and for one of the transmission gap patterns, the distance between transmission gaps is 20 msec.

For the above case, it can be shown that the average number of different combinations for the compressed mode for each TFC is 11, which includes 3 (single transmission gap) plus 3 (two transmission gaps from different patterns) plus 1 (two transmission gaps from the same pattern) plus 1 (three transmission gaps from different patterns) plus 2 (two transmission gaps from the same pattern and one from the other pattern) plus 1 (four transmission gaps, two from the same pattern). Thus, for this specific compressed mode case, 12 different combinations are possible for each configured TFC (i.e., 11 combinations for the compressed mode and one for the normal mode). Based on the above assumptions, each of these combinations would correspond to a different cumulative transmission gap length and therefore to a different relative power requirement, $\alpha$.

Aspects of the invention provide various techniques for determining valid (i.e., supported) TFCs from among all configured TFCs for compressed mode as well as for normal mode. These techniques maintain sufficient historical information (in various forms, as described below) such that TFC qualification may be accurately performed regardless of whether or not a TTI includes a compressed transmission. A number of TFC qualification schemes are described below. These schemes may be applied in conjunction with the algorithm defined in W-CDMA and described in FIG. 4, whereby the determination of whether or not a TFC may be transmitted reliably is dependent on the TFC's required transmit power for Y previous measurement periods and the maximum available transmit power.

In a first TFC qualification scheme, a number of Tx_power_requirement states is maintained for a number of combinations for each TFC if the compressed mode is used, with the number of states being equal to the number of different combinations for the TFC as described above. Different combinations for a given TFC require different transmit power levels for reliable transmission and are thus associated with different relative power requirements, $\alpha_i^j$. The different combinations for each TFC may be determined in advance, and the corresponding relative power requirements, $\alpha_i^j$, may then be determined for each combination.

If the average number of different combinations for each TFC for the compressed and normal modes is $N_C$ and the number of configured TFCs is $N_T$, then the number of bits needed for the indicators for all combinations of all TFCs is $N_C \cdot N_T \cdot Y$. For example, if the TFC set includes 128 TFCs (e.g., for the 384 kbps class of UE) and the average number of different combinations for each TFC is 12, then $12 \cdot 128 \cdot Y = 1536 \cdot Y$ bits may be used to store the indicators for the 11 different combinations for the compressed mode and one for the normal mode.

Figure 7:
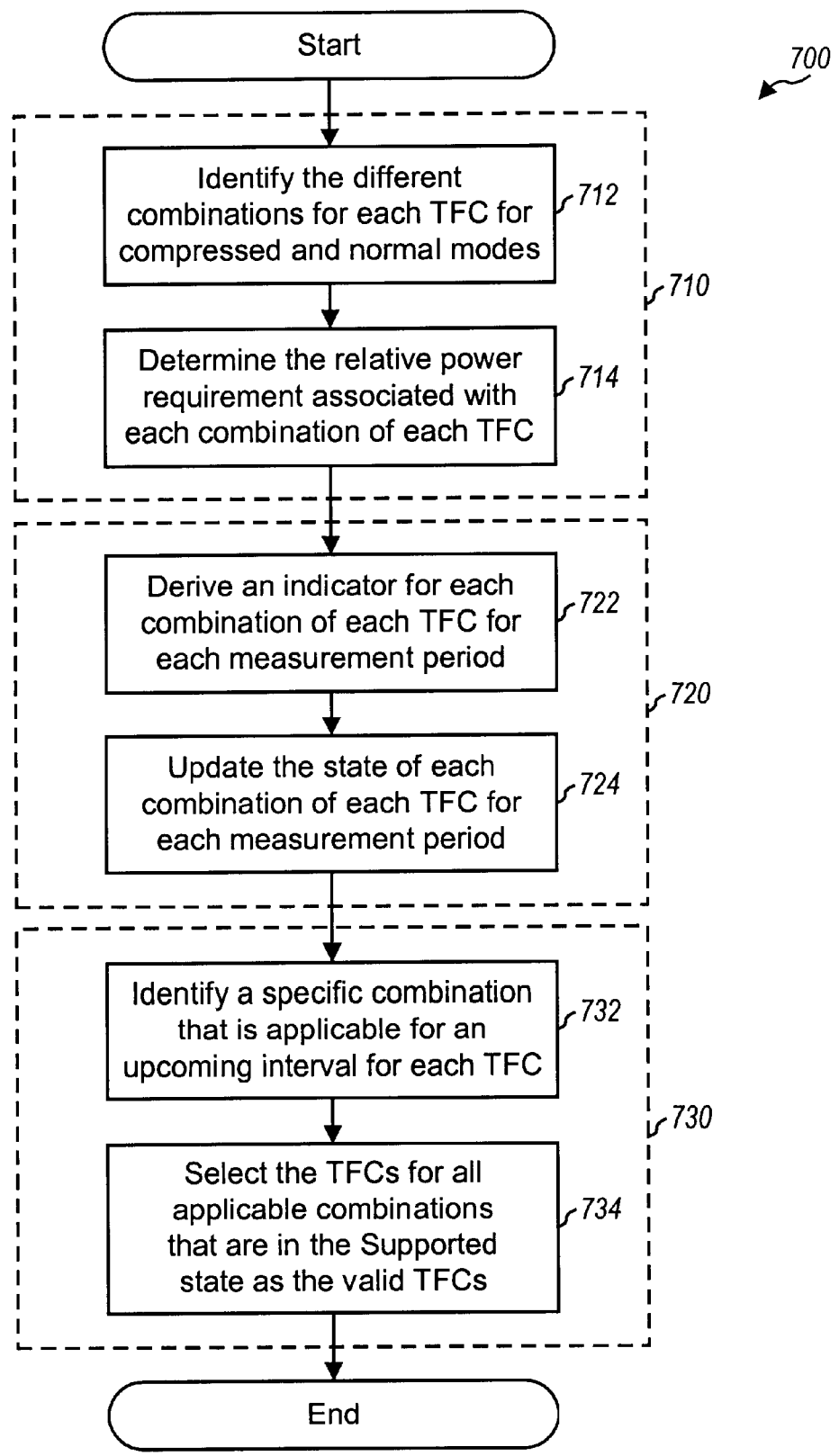
FIG. 7 is a flow diagram of an embodiment of a process to determine TFCs supported for use based on Tx_power_requirement states maintained for multiple combinations for each TFC.

FIG. 7 is a flow diagram of an embodiment of a process 700 to determine TFCs that are supported by the system and may be selected for use, in accordance with the first TFC qualification scheme. Initially, the different combinations possible for each configured TFC are identified, at step 712. Each such combination corresponds to a specific combination of compressed and/or non-compressed frames used for a data transmission, and is associated with a particular required transmit power level to achieve the desired level of performance. If only the normal mode is used for the data transmission, then only one combination (i.e., with no transmission gaps) exists for each TFC. But if the compressed mode is used for the data transmission, then multiple combinations of compressed and/or non-compressed frames may be possible for each TFC and are identified in step 712. The number of different combinations for each TFC is dependent on the parameter values defined for the compressed mode transmission for the transport channels, as described above.

The relative power requirement, $\alpha_i^j$, associated with each combination for each TFC is then determined (i.e., $\alpha_i^j$ is the relative power requirement for the j-th combination for the i-th TFC), at step 714. The relative power requirement is indicative of the relative transmit power required for the combination if it is selected for use. For each TFC, the relative power requirement, $\alpha_i^j$, for each combination for the compressed mode is higher than the relative power requirement for the combination for the normal mode, with the difference in relative power requirements being related to the data rate for the compressed frame in the compressed mode and the data rate for the non-compressed frame in the normal mode. In particular, the relative power requirement for the normal mode is described in 3GPP Document No. 25.214-360, Section 5.1.2.5.3, and for the compressed mode is described in Section 5.1.2.5.4. Steps 712 and 714 are setup steps that may be performed once upon entering the compressed mode.

The state of each combination for each TFC is thereafter updated for each measurement period. This may be achieved by deriving the indicator for each combination for each TFC (e.g., by performing the comparison $\alpha_i^j \cdot P_{ref} > P_{max}$), at step 722. The state of each combination for each TFC is then updated based in part on the newly derived indicator, and may be determined based on the state diagram shown in FIG. 4, at step 724.

The supported combinations for all configured TFCs are then selected for possible use at each TFC selection interval. This may be achieved by identifying a specific combination, from among the $N_C$ different combinations, that is applicable for an upcoming interval for each TFC, at step 732. $N_T$ combinations are identified as being applicable for the upcoming interval for $N_T$ TFCs, in step 732. The TFCs for all applicable combinations that are in the Supported state (and possibly the Excess-Power state) are then selected as the valid TFCs, at step 734.

In a second TFC qualification scheme, two Tx_power_requirement states are maintained for each TFC for the normal and compressed modes. Although a number of combinations may be possible for each TFC in the compressed mode, the worst-case transmit power requirement occurs when a transmission gap represents 7 out of 15 slots in a compressed frame. In this case, the data for the compressed frame needs to be transmitted within 8 slots instead of the entire 15 slots, and almost twice the amount of transmit power (or 3 dB of additional transmit power) is needed to achieve the required $E_b/N_t$ for the compressed frame. Thus, a single additional Tx_power_requirement state may be maintained for each TFC for a relative power requirement, $\alpha_{max,i}$, corresponding to the worst-case transmit power requirement for the TFC for the compressed mode. In an embodiment, the relative power requirement, $\alpha_{max,i}$, for the compressed mode may be set at approximately twice (or 3 dB) higher than the relative power requirement, $\alpha_i$, for the normal mode. Other values for the difference between the normal and worst-case relative power requirements may also be used (instead of 3 dB), and this is within the scope of the invention.

Maintaining two Tx_power_requirement states for each TFC (instead of the $N_C$ states maintained by the first TFC qualification scheme), may lead to significantly reduced buffering and processing requirements. For the example described above with $N_C = 12$, a 6 to 1 reduction in buffering and processing is achieved since only two states are maintained for each TFC by the second scheme versus the 12 states maintained by the first scheme.

The use of a single additional relative power requirement, $\alpha_{max,i}$, for each TFC for all possible combinations in the compressed mode results in a pessimistic selection of TFCs for TTIs with compressed frames. This is because combinations with relative power requirements smaller than $\alpha_{max,i}$ are also represented by $\alpha_{max,i}$. In another embodiment, the additional Tx_power_requirement state may be maintained for an average relative power requirement, $\alpha_{avg,i}$, corresponding to an average transmit power required for all possible combinations in the compressed mode. This average relative power requirement, $\alpha_{avg,i}$, may be computed as an average of the relative power requirements for all possible combinations for a given TFC, which may be expressed as:

$$\alpha_{avg,i} = \sum_j \alpha_i^j.$$

Alternatively, the average relative power requirement, $\alpha_{avg,i}$, may be computed as a weighted average of the relative power requirements for all possible combinations for a given TFC, which may be expressed as:

$$\alpha_{avg,i} = \sum_j w_i^j \cdot \alpha_i^j,$$

where $w_i^j$ may be the frequency of occurrence of the j-th combination for the i-th TFC. In general, the sum of the weights is equal to one (1.0). The weights, $w_i^j$, and/or the average relative power requirement, $\alpha_{avg,i}$, may be determined for each TFC by the terminal. Alternatively, the weights, $w_i^j$, and/or the average relative power requirement, $\alpha_{avg,i}$, may be determined by the base station and signaled to the terminal (e.g., using layer 3 signaling).

In general, the additional Tx_power_requirement state for the compressed mode for each TFC may be maintained for a compressed mode relative power requirement, $\alpha_{cm,i}$. This $\alpha_{cm,i}$ may be defined as the relative power requirement for the normal mode, $\alpha_{ref,i}$, times an offset $\alpha_{offset,i}$ (i.e., $\alpha_{cm,i} = \alpha_{ref,i} \cdot \alpha_{offset,i}$). This offset typically ranges from zero (0.0) to the worst-case additional relative power requirement (i.e., $0.0 \leq \alpha_{offset,i} \leq \alpha_{max,i}$). The offset for each TFC may be determined by the terminal, or by the system and signaled to the terminal, or by some other means.

In a third TFC qualification scheme, a single Tx_power_requirement state is maintained for each TFC for both normal and compressed modes. This single Tx_power_requirement state may be maintained for each TFC for the compressed mode relative power requirement, $\alpha_{cm,i}$, which may be defined as the described above (i.e., $\alpha_{cm,i} = \alpha_{ref,i} \cdot \alpha_{offset,i}$). Again, the offset for the compressed mode for each TFC may be determined and/or provided by various means, and may be indicative of the worst-case relative additional power requirement for all combinations for the TFC, the average relative additional power requirement, or some other value.

In a fourth TFC qualification scheme, a number of Tx_power_requirement states is maintained for a set of "bins", with each such bin corresponding to a specific relative power requirement. Each combination for each TFC is associated with a particular relative required transmit power, and may therefore be associated with a specific bin and may further utilize the Tx_power_requirement state maintained for that bin.

The total range of relative power requirements for all TFCs, which covers the largest to the smallest relative power requirements for all TFCs for the compressed and normal modes, is typically not very large (e.g., typically much less than 30 dB). Moreover, the specified accuracy for the transmit power measurement is not overly precise (e.g., 0.5 dB or worse). Thus, only a relatively small number of bins that are spaced by a particular amount apart (or bin size) are typically sufficient to represent the relative power requirements for all possible combinations for all TFCs for both compressed and normal modes. A limited number of Tx_power_requirement states may then be maintained for these bins, and the Tx_power_requirement state for each bin may be referenced by all combinations associated with that bin.

As an example, if the total range of relative power requirements for all TFCs is 30 dB and a bin size of 0.5 dB is used, then 61 Tx_power_requirement states may be maintained for the 61 bins covering the 30 dB range. This would represent a significant reduction from the 1536 and 256 states needed to be maintained using the first and second schemes, respectively, described above with $N_T$=128. Since each of these states needs to be maintained, the processing requirements are also reduced commensurably.

The total range of 30 dB for the relative power requirements may represent an overly conservative estimate. The total range is bounded by the ratio of the highest data rate for all combinations for all TFCs over the data rate for the reference transmission (assuming no control overhead). For most cases, this ratio may only be 10 to 1 or less, in which case the total range would only be 10 dB or less. Moreover, since the estimate of the maximum available transmit power, $P_{max}$, is required to be accurate to within 2 dB, a bin size more coarse than 0.5 dB may also be used. Thus, even fewer bins would be needed for a smaller total range and/or a coarser bin size. In general, any number of bins may be maintained and the bin size may be uniform or varying. The specific values for the bins may be determined based on system requirements.

Figure 8:
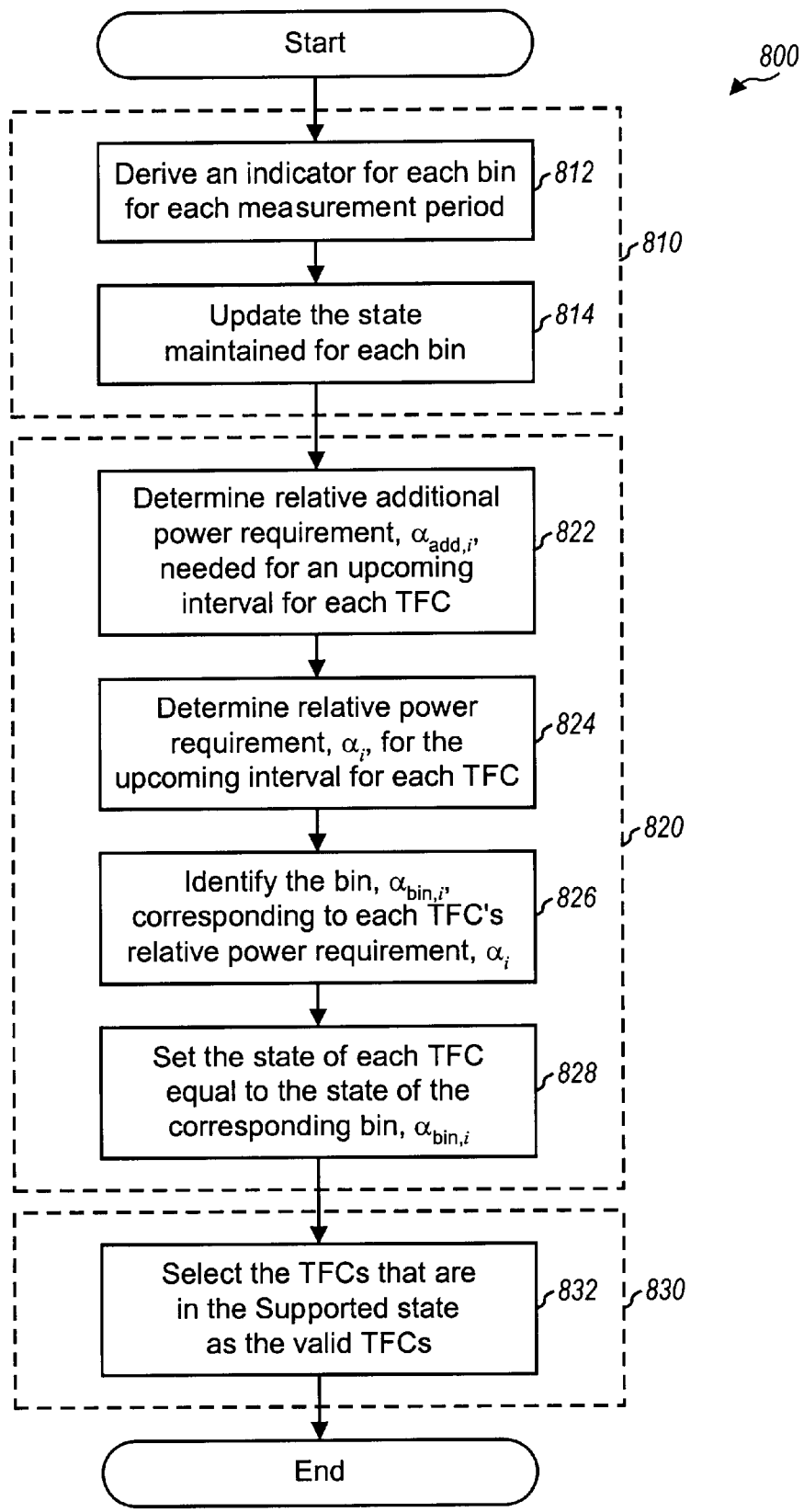
FIG. 8 is a flow diagram of an embodiment of a process to determine TFCs supported for use based on Tx_power_requirement states maintained for a set of bins.

FIG. 8 is a flow diagram of an embodiment of a process 800 to determine TFCs that are supported by the system and may be selected for use, based on Tx_power_requirement states maintained for a set of bins. Initially, a set of bins, $\alpha_{bin,i}$, associated with a set of transmit power levels relative to a reference transmit power level is defined. For the example described above, 61 bins are defined for a range of 30 dB, with the bins being spaced apart by 0.5 dB. The bins may be defined once and thereafter used for each communication between the terminal and the system. The bins may be sorted in decreasing order, from the largest bin to the smallest bin.

The Tx_power_requirement states for the set of bins are maintained during the communication, as described above for FIG. 4. In particular, for each measurement period, the expression $\alpha_{bin,i} \cdot P_{ref} > P_{max}$ is evaluated for each bin to derive a corresponding indicator for the bin, at step 812. This indicator indicates whether or not the transmit power level required by the bin is supported by the maximum available transmit power. For each measurement period, the state of each bin is then updated accordingly based on the newly derived indicator and Y–1 other indicators previously derived for the bin, at step 814.

For each TFC selection interval, the states of the configured TFCs are determined. This may be achieved by first determining the relative additional transmit power needed to achieve the required $E_b/N_t$ for each TFC for the upcoming interval when the TFC may be used, at step 822. If $\alpha_{add,i}$ represents the relative additional transmit power and $\alpha_{ref,i}$ represents the relative power requirement for the normal mode for the i-th TFC, then the relative power requirement, $\alpha_i$, for the upcoming interval for the i-th TFC may be determined as:

$$\alpha_i = \alpha_{add,i} \cdot \alpha_{ref,i}. \quad \text{Eq(2)}$$

The relative additional transmit power, $\alpha_{add,i}$, is dependent on, and accounts for, the presence of any transmission gap in the upcoming interval. If there are no transmission gaps in the upcoming interval, then $\alpha_{add,i} = 1$. The relative power requirement, $\alpha_i$, is determined for each TFC as shown in equation (2), in step 824.

A specific bin, $\alpha_{bin,i}$, corresponding to the relative power requirement, $\alpha_i$, of each TFC is then identified, at step 826. The bin for each TFC may be determined as:

$$\alpha_{bin,i} = \text{round}(\alpha_i),$$

where the rounding is to the next lower bin. The state of each TFC for the upcoming interval is then set equal to the state of the bin, $\alpha_{bin,i}$, corresponding to the TFC's relative power requirement, $\alpha_i$, at step 828.

The TFCs supported in the upcoming interval are then identified. This may be achieved by selecting all TFCs in the Supported state (and possibly the Excess-Power state) as the valid TFCs, at step 832.

The fourth TFC qualification scheme provides several advantages. First, the amount of buffering and processing required may be reduced since a smaller number of Tx_power_requirement states may be maintained for all configured TFCs. Second, it is not necessary to determine all the possible combinations in advance. Instead, these combinations may be determined if and when transmission gaps are present in the interval being evaluated. Third, the states of the TFCs for the compressed mode may be determined immediately upon entering the compressed mode (i.e., no processing delay) since the indicators for the Y most recent measurement periods are available for all possible combinations of all TFCs. In contrast, the first and second schemes start storing the indicators when the relative power requirement is known, which may then result in Y measurement periods of delay before the state can be determined. Fourth, the buffering requirements do not increase with the number of TFCs and the processing requirements increase more slowly than for the first scheme.

In a fifth TFC qualification scheme, a set of relative power requirement "thresholds" are determined and maintained for Y measurement periods and used to determine the state of each configured TFC. In an embodiment, the relative power requirement threshold is defined as the ratio of the maximum available transmit power over the required transmit power for the reference transmission. For each measurement period, the relative power requirement threshold, $\alpha_{th}(k)$, may be determined as:

$$\alpha_{th}(k) = \frac{P_{max}}{P_{ref}(k)}, \qquad \text{Eq (3)}$$

where $P_{ref}(k)$ is the required transmit power for the reference transmission for the k-th measurement period. If the maximum available transmit power for the terminal is constant (which is typically true unless it is adjusted by the system), then the relative power requirement threshold is indicative of, and related to, the required transmit power for the reference transmission. The relative power requirement threshold, $\alpha_{th}(k)$, should have the same dynamic range and accuracy as for the TFC relative power requirement, $\alpha_i$. Thus, the relative power requirement thresholds have similar buffering requirements as for the bins in the fourth scheme.

Along with the set of Y relative power requirement thresholds, a (e.g., 2-bit) state may be maintained for each possible combination for each TFC in the compressed mode. Alternatively, a state may be maintained for each different relative power requirement (similar in concept to the bins described above). Moreover, a timer may be maintained for each possible combination, or for each different relative power requirement (or bin). The timer is used to determine the transition between the Excess-Power state and the Blocked state.

For each TFC selection interval, the applicable combination for each TFC for the upcoming TFC interval is initially identified. The state of the applicable combination for each TFC is then determined based on (1) the relative additional transmit power, $\alpha_{add,i}$, required by the applicable combination, (2) the relative power requirement, $\alpha_{ref,i}$, for the normal mode for the TFC, (3) the set of Y relative power requirement thresholds, and (4) the (2-bit) state and timer maintained for the combination or the associated bin.

Figure 9:
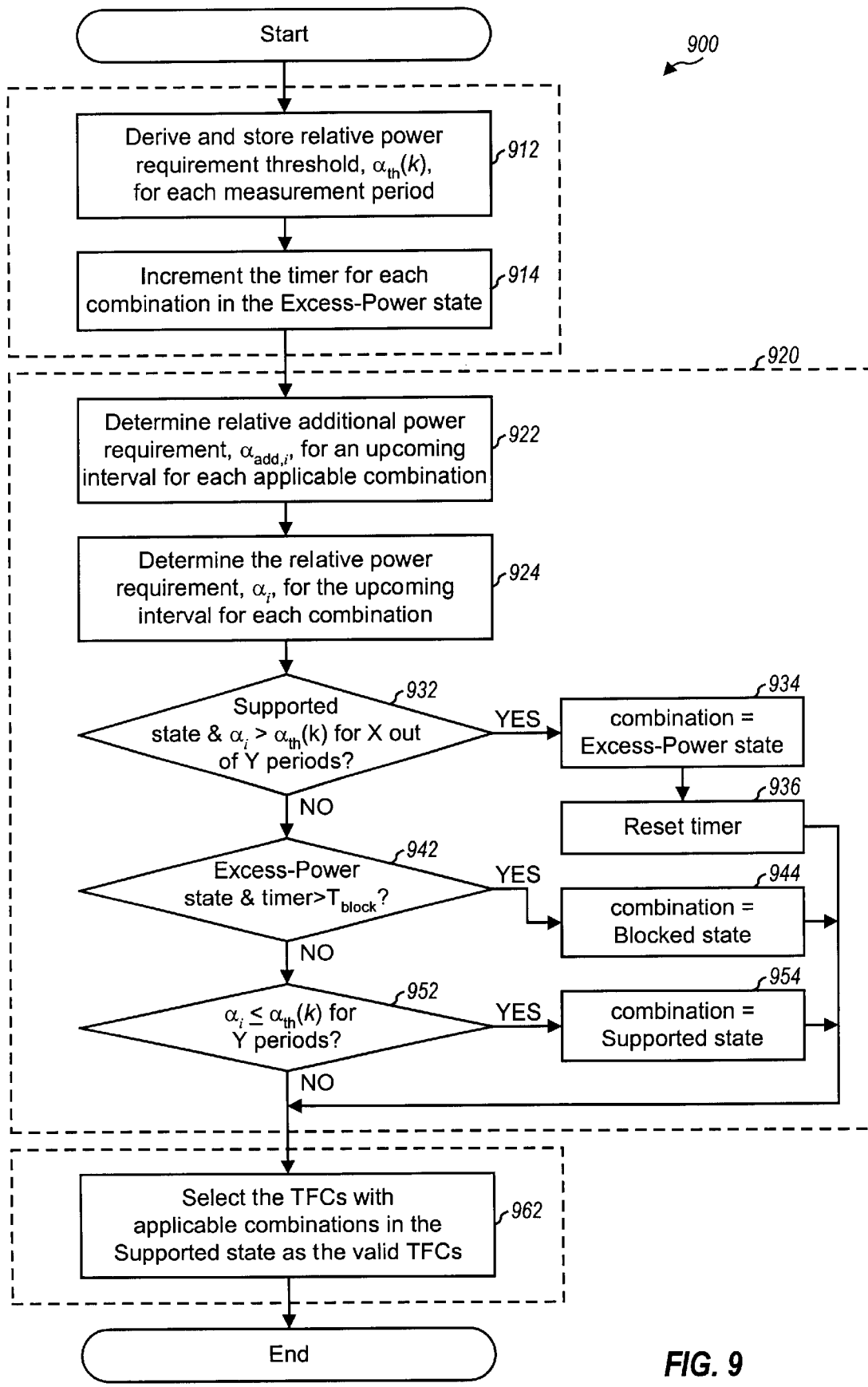
FIG. 9 is a flow diagram of an embodiment of a process to determine TFCs supported for use based on a set of relative power requirement thresholds.

FIG. 9 is a flow diagram of an embodiment of a process 900 to determine TFCs that are supported by the system and may be selected for use, based on a set of relative power requirement thresholds determined for Y measurement periods. Although not shown in FIG. 9 for simplicity, the state of each combination for each TFC is initialized to the Supported state. For each measurement period, the relative power requirement threshold, $\alpha_{th}(k)$, is determined as shown in equation (3) and stored to a buffer, at step 912. For the embodiment shown in FIG. 9, a timer is maintained for each combination in the Excess-Power state, and this timer is also updated for each measurement period, at step 914. Steps 912 and 914 are performed for each measurement period.

For each TFC selection interval, the state of each applicable combination for each TFC is determined in accordance with the steps in block 920. This may be achieved by first determining the relative additional transmit power, $\alpha_{add,i}$, needed to achieve the required $E_b/N_t$ for an upcoming interval for each applicable combination, at step 922. The relative power requirement, $\alpha_i$, for the upcoming interval for each applicable combination may then be determined based on the relative additional transmit power, $\alpha_{add,i}$, and the relative power requirement, $\alpha_{ref,i}$, for the normal mode, as shown in equation (2), at step 924. The state of each applicable combination is then determined based on steps 932 through 954, which are described below for one example combination.

At step 932, a determination is made whether or not the applicable combination is in the Supported state and the relative power requirement, $\alpha_i$, for the combination is greater than the relative power requirement thresholds, $\alpha_{th}(k)$, for more than X out of the last Y measurement periods. If the answer is yes, then the combination is set to the Excess-Power state, at step 934, and the timer for the combination is reset, at step 936. The process then proceeds to step 962.

Otherwise, a determination is made whether or not the combination is in the Excess-Power state and its associated timer is greater than $T_{block}$, at step 942. If the answer is yes, then the combination is set to the Blocked state, at step 944. The process then proceeds to step 962.

Otherwise, a determination is made whether or not the combination's relative power requirement, $\alpha_i$, is equal to or less than the relative power requirement threshold, $\alpha_{th}(k)$, for the last Y measurement periods, at step 952. If the answer is yes, then the combination is set to the Supported state, at step 954.

Again, steps 932 through 954 are performed for each applicable combination. Upon completion of these steps for all applicable combinations, the process proceeds to step 962 to identify the TFCs supported in the upcoming interval. This may be achieved by selecting all TFCs with applicable combinations in the Supported state (and possibly the Excess-Power state) as the valid TFCs, at step 962.

For the fifth scheme, the comparisons across all Y measurement periods are performed for each combination for each TFC (or each bin) and for each TFC selection interval. The fifth scheme may provide many of the advantages enumerated above for the fourth scheme, including reduced buffering requirements (to store the relative power requirements) and the flexibility to cover all possible TFCs and their combinations with little or no additional increase in buffering requirements.

In the above description for the fifth scheme, the relative power requirement thresholds, $\alpha_{th}(k)$, are derived and stored. In other embodiments, other values indicative of (or related to) the required transmit power for the reference transmission may also be derived and stored. For example, the required transmit power, $P_{ref}(k)$, itself may be stored along with the maximum available transmit power, $P_{max}$. To determine the state of a given TFC, the required transmit power for the TFC may initially be derived as $\alpha_i \cdot P_{ref}(k)$ and then compared against the maximum available transmit power, $P_{max}$. The indicators derived from the comparisons may then be used to determine the state of the TFC.

The various TFC qualification schemes described above may be used to determine which ones of the configured TFCs are supported by the terminal and channel conditions (i.e., capable of achieving the required $E_b/N_t$) and thus may be selected for use in an upcoming interval. These schemes may be used for the normal mode, the compressed mode, or both modes, and effectively implement different policies for declaring whether or not a given TFC is supported in the upcoming interval depending on whether or not transmission gaps are present in the interval. Other TFC qualification schemes or variations of the schemes described herein may also be implemented, and still be within the scope of the invention.

For clarity, the TFC qualification schemes have also been described for a specific algorithm defined in W-CDMA and described in FIG. 4, whereby a TFC is deemed as being supported if the TFC's required transmit power, $\alpha_i \cdot P_{ref}$, is not greater than the maximum available transmit power, $P_{max}$, for more than X out of the last Y measurement periods. The TFC qualification schemes described herein may also be used in conjunction with other algorithms, and this is within the scope of the invention.

The TFC qualification techniques described herein may be advantageously implemented for the uplink transmission in a W-CDMA system. These techniques or variants thereof may be adopted for use for the downlink and/or for other CDMA systems, and this is within the scope of the invention.

The techniques described herein may be implemented by various means. For example, these techniques may be implemented in hardware, software, or a combination thereof. For a hardware implementation, the elements used to implement all or portions of these techniques may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, the techniques described herein may be implemented with modules (e.g., procedures, functions, and so on) that perform the functions described herein. The software codes may be stored in a memory unit (e.g., memory 132 or 162 in FIG. 1) and executed by a processor (e.g., controller 130 or 160). The memory unit may be implemented within the processor or external to the processor, in which case it can be communicatively coupled to the processor via various means as is known in the art.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for determining transport format combinations (TFCs) supported for use in a wireless communication system, comprising:
   determining a required transmit power for each of a plurality of combinations for each of one or more TFCs, wherein each TFC corresponds to a set of parameter values for a data transmission and each combination for each TFC corresponds to a particular transmission level for the data transmission;
   determining a state of each combination for each TFC based on the required transmit power for the combination and a maximum available transmit power; and
   selecting one combination for each of at least one TFC for possible use for an upcoming interval based on the state of each combination.

2. The method of claim 1, wherein the plurality of possible combinations for each TFC comprise one combination for a normal mode and at least one combination for a compressed mode.

3. The method of claim 2, wherein the particular transmission level for each combination for each TFC is determined by transmission gap parameter values defined for the compressed mode.

4. The method of claim 2, wherein the particular transmission level for each combination for each TFC is determined for a particular set of one or more frames to be transmitted on one or more transport channels.

5. The method of claim 2, further comprising:
   identifying a specific combination, from among the plurality of possible combinations, that is applicable for the upcoming interval for each TFC, and wherein at least one applicable combination is selected for possible use for the upcoming interval.

6. The method of claim 5, wherein each combination for each TFC is in one of a plurality of possible states.

7. The method of claim 6, wherein the plurality of possible states include a Supported state, an Excess-Power state, and a Blocked state.

8. The method of claim 7, wherein applicable combinations in the Supported state are selected for possible use for the upcoming interval.

9. The method of claim 1, wherein the required transmit power for each combination for each TFC is determined based on a relative power requirement associated with the combination and a required transmit power for a reference transmission.

10. The method of claim 1, further comprising:
    for each combination for each TFC, deriving an indicator for each measurement period indicative of whether or not the required transmit power for the combination is supported by the maximum available transmit power, and
    wherein the state of each combination for each TFC is determined based on indicators for Y measurement periods.

11. The method of claim 10, further comprising:
    storing the indicators for Y measurement periods for each combination for each TFC.

12. The method of claim 1, wherein the plurality of possible combinations for each TFC comprise one combination for a normal mode and one combination for a compressed mode.

13. The method of claim 12, wherein the combination for the compressed mode for each TFC is associated with a highest required transmit power in the compressed mode for the TFC.

14. The method of claim 12, wherein the combination for the compressed mode for each TFC is associated with an average required transmit power in the compressed mode for the TFC.

15. The method of claim 12, further comprising:
    for each combination for each TFC, deriving an indicator for each measurement period indicative of whether or not the required transmit power for the combination is supported by the maximum available transmit power, and
    wherein the state of each combination for each TFC is determined based on indicators for Y measurement periods.

16. The method of claim 15, further comprising:
storing two sets of indicators for Y measurement periods for the two combinations of each TFC.

17. The method of claim 1, wherein the wireless communication system is a W-CDMA system.

18. A memory communicatively coupled to a digital signal processing device (DSPD) capable of interpreting digital information to:
determine a required transmit power for each of a plurality of combinations for each of one or more TFCs, wherein each TFC corresponds to a set of parameter values for a data transmission and each combination for each TFC corresponds to a particular transmission level for the data transmission;
determine a state of each combination for each TFC based on the required transmit power for the combination and a maximum available transmit power; and
select one combination for each of at least one TFC for possible use for an upcoming interval based on the state of each combination.

19. A method for determining transport format combinations (TFCs) supported for use in a wireless communication system, comprising:
for each of a plurality of bins, deriving an indicator for each measurement period indicative of whether or not a required transmit power for the bin is supported by a maximum available transmit power;
identifying a specific bin, from among the plurality of bins, that is applicable for an upcoming interval for each of one or more TFCs based on a required transmit power for the TFC for the upcoming interval;
determining a state of each TFC for the upcoming interval based on indicators derived for the bin applicable to the TFC; and
selecting one or more TFCs for possible use for the upcoming interval based on the state of each TFC.

20. The method of claim 19, further comprising:
maintaining a state for each bin;
updating the state of each bin for each measurement period based on indicators derived for the bin; and
setting the state of each TFC equal to the state of the bin applicable to the TFC.

21. The method of claim 19, wherein the plurality of bins are defined for a plurality of transmit power levels relative to a reference transmit power level.

22. The method of claim 19, wherein the required transmit power for each TFC is dependent on whether a normal mode or a compressed mode is used for a data transmission.

23. The method of claim 22, wherein the required transmit power for each TFC is further dependent on a particular set of one or more frames to be transmitted for the TFC in the upcoming interval.

24. The method of claim 19, wherein the plurality of bins cover a range of transmit power required for all TFCs.

25. The method of claim 24, wherein the plurality of bins are separated by a uniform amount.

26. The method of claim 19, wherein the wireless communication system is a W-CDMA system.

27. A method for determining transport format combinations (TFCs) supported for use in a wireless communication system, comprising:
for each measurement period, determining a value indicative of transmit power available for a data transmission;
determining a state of each of one or more TFCs for an upcoming interval based in part on a plurality of values determined for a plurality of measurement periods; and
selecting one or more TFCs for possible use for the upcoming interval based on the state of each TFC.

28. The method of claim 27, wherein the value is determined as a ratio of a maximum available transmit power over a required transmit power for a reference transmission.

29. The method of claim 27, further comprising:
determining a required transmit power for each TFC; and
comparing the required transmit power for each TFC against the plurality of values for the plurality of measurement periods, and
wherein the state of each TFC is determined based on results of the comparison.

30. The method of claim 27, wherein the state of each TFC is determined anew for each interval based on the plurality of values determined for the plurality of measurement periods.

31. The method of claim 27, wherein the state of each TFC is determined by storing a current state of each TFC, and
updating the state of each TFC for each measurement period based on the stored current state of the TFC and the plurality of values determined for the plurality of measurement periods.

32. The method of claim 27, wherein the wireless communication system is a W-CDMA system.

33. A digital signal processor in a wireless communication system configured to determine a required transmit power for each of a plurality of combinations for each of one or more TFCs, wherein each TFC corresponds to a set of parameter values for a data transmission and each combination for each TFC corresponds to a particular transmission level for the data transmission, to determine a state of each combination for each TFC based on the required transmit power for the combination and a maximum available transmit power, and to select one combination for each of at least one TFC for possible use for an upcoming interval based on the state of each combination.

34. A transmitter unit in a wireless communication system, comprising:
a controller operative to determine a required transmit power for each combination for each TFC, wherein each TFC corresponds to a set of parameter values for a data transmission and each combination for each TFC corresponds to a particular transmission level for the data transmission, to determine a state of each combination for each TFC based on the required transmit power for the combination and a maximum available transmit power, and to select one combination for each of one or more TFCs for possible use for an upcoming interval based on the state of each combination; and
a memory operative to store a plurality of values related to the required transmit power for a reference transmission for a plurality of measurement periods.

35. The transmitter unit of claim 34, wherein the memory is operative to store a set of values for the plurality of measurement periods for each combination for each TFC.

36. The transmitter unit of claim 34, wherein the memory is operative to store two sets of values for the plurality of measurement periods for two combinations of each TFC.

37. A terminal comprising the transmitter unit of claim 34.

38. A base station comprising the transmitter unit of claim 34.

39. A signal processing apparatus in a wireless communication system, comprising:
means for determining a required transmit power for each of a plurality of combinations for each of one or more TFCs, wherein each TFC corresponds to a set of parameter values for a data transmission and each combination for each TFC corresponds to a particular transmission level for the data transmission;

means for determining a state of each combination for each TFC based on the required transmit power for the combination and a maximum available transmit power; and means for selecting one combination for each of at least one TFC for possible use for an upcoming interval based on the state of each combination.

40. A digital signal processor in a wireless communication system configured to receive an indicator for each measurement period indicative of whether or not a required transmit power for each of a plurality of bins is supported by a maximum available transmit power, to identify a specific bin, from among the plurality of bins, that is applicable for an upcoming interval for each of one or more TFCs based on a required transmit power for the TFC for the upcoming interval, to determine a state of each TFC for the upcoming interval based on indicators derived for the bin applicable to the TFC, and to select one or more TFCs for possible use for the upcoming interval based on the state of each TFC.

41. A digital signal processor in a wireless communication system configured to determine a value indicative of transmit power available for a data transmission for each measurement period, to determine a state of each of one or more TFCs for an upcoming interval based in part on a plurality of values determined for a plurality of measurement periods, and to select one or more TFCs for possible use for the upcoming interval based on the state of each TFC.

* * * * *